United States Patent
Dunn

(10) Patent No.: US 6,568,633 B2
(45) Date of Patent: May 27, 2003

(54) FUEL CELL POWERED ELECTRIC AIRCRAFT

(76) Inventor: James P. Dunn, 24 Eastern Pt., Shrewbury, MA (US) 01545

( * ) Notice: Subject to any disclaimer, the term of this patent is extended or adjusted under 35 U.S.C. 154(b) by 0 days.

(21) Appl. No.: 09/938,877

(22) Filed: Jun. 24, 2001

(65) Prior Publication Data

US 2003/0075643 A1 Apr. 24, 2003

Related U.S. Application Data

(60) Provisional application No. 60/227,720, filed on Aug. 24, 2000, and provisional application No. 60/230,292, filed on Sep. 1, 2000.

(51) Int. Cl.[7] .............................................. B64D 27/00
(52) U.S. Cl. ...................................... 244/59; 244/53 R
(58) Field of Search ................................ 244/59, 53 R, 244/62; 429/19, 12, 20, 13

(56) References Cited

U.S. PATENT DOCUMENTS

| | | | | |
|---|---|---|---|---|
| 3,801,372 | A | * | 4/1974 | Shaw |
| 5,106,035 | A | * | 4/1992 | Langford |
| 5,810,284 | A | * | 9/1998 | Hibbs et al. |
| 6,119,979 | A | * | 9/2000 | Lee et al. |
| 6,322,915 | B1 | * | 11/2001 | Collins et al. |
| 2001/0018138 | A1 | * | 8/2001 | Iwase |
| 2002/0005454 | A1 | * | 1/2002 | MacCready et al. |

FOREIGN PATENT DOCUMENTS

DE  19821952  * 11/1999

OTHER PUBLICATIONS

Author, Sharon Thomas and Marcia Zalbowitz; Title, Fuel Cells—Green Power (http://ehgtechnology.com/fuel-cell.pdf); Date, Unknown; Pertinent p., 18.

* cited by examiner

*Primary Examiner*—Tien Dinh
(74) *Attorney, Agent, or Firm*—Rutan & Tucker, LLP

(57) ABSTRACT

Electrically powered aircraft having fuel cells as at least a partial source of electrical energy. In many instances the electrical energy powers an electric motor used to propel the aircraft. In some instances, the electric output from the fuel cell would be augmented by power from special high power "surge" batteries for critical takeoff and climbing, where the maximum electric power is required. In preferred embodiments, such fuel cell powered aircraft will supply oxygen to the fuel cell either from a container of oxygen carried on board the aircraft, or from a ram scoop which directs air through which the aircraft is moving to the fuel cell.

16 Claims, 3 Drawing Sheets

FUEL CELL POWERED ELECTRIC AIRCRAFT

This application claims the benefit of U.S. provisional applications No. 60/227,720 Aug. 24, 2000, and No. 60/230, 292, Sep. 1, 2000 each of which is incorporated herein by reference in its entirety.

FIELD OF THE INVENTION

The field of the invention is aircraft propulsion and power systems and operation.

BACKGROUND OF THE INVENTION

Propelled aircraft such as airplanes and rotorcraft have traditionally used combustible fuels such as gasoline or diesel fuel in internal combustion engines or turbines/jets for propulsion. This dependence on such fuels is likely principally due to their extremely high energy content. Unfortunately, the use of such aircraft is not always desirable for a number of reasons including relatively higher costs for production, maintenance and training, a relatively high risk of failure during operation, and the noise and emissions (particularly $CO_2$).

An alternative to the use of combustion engines and turbines/jets for propulsion is the use of high efficiency electric motors. Advanced, high efficiency electric motors and controllers have already proven their usefulness on a host of unmanned solar-powered aircraft like the AeroViroment Pathfinder, Centurian, and the recent 14 motor Helios. Unfortunately, solar power is not practical for general aviation, due to the large surface area required, the altitudes required to get over clouds (and the lower atmosphere), and the limitation of flying only during bright sunny daytime hours. Moreover, solar powered aircraft are very limited in speed and weight capacity and structurally unsafe for manned usage.

Attempts at using batteries to power an aircraft have also occurred. As an example, several attempts have been made to utilize rechargeable batteries in electrically powered aircraft such as the European Silent Ael and the Antares self launching gliders. In such gliders, the batteries are used for takeoff power to launch the glider to sufficient height to pick up a thermal and continue "gliding", typically less than 8 minutes per charge. However, the weight of sufficient batteries for takeoff and any reasonable flight leaves no weight allowance for the pilot and passengers, thus rendering the airplane useless for typical piloted flight.

Unfortunately, when compared to the energy content of gasoline, most rechargeable batteries offer less than 3% of the specific energy per pound of gasoline. Even after considering the poor conversion efficiency of internal combustion engines of less than 25% (versus over 90% efficiency for electric motors), gasoline still has nearly a 10 to 1 advantage of specific energy and energy density over rechargeable batteries. Although the energy density of batteries has improved dramatically over the last 10 years, it still needs dramatic improvement in specific energy performance (and cost reduction) to become commercially viable and competitive with gasoline for practical electric vehicle use (particularly including aircraft). Recent developments in advanced battery performance, particularly with rechargeable NiMH, Li-Ion, and Lithium Polymer chemistries begin to close the gap on the energy density of gasoline, but are still insufficient to operate manned electric airplanes, and cost prohibitive for other aircraft applications.

The use of fuel cells for providing electrical energy are known, most existing fuel cells are not suitable for use in aircraft. Fuel cells are currently being studied for automotive use as possibly providing higher net energy densities than batteries. Unfortunately, many fuel cell systems used in automobiles are unsuitable for use in aircraft, primarily due to the weight and power drain of all the special components required for operation of such fuel cells. Such components typically include compressors and hydrators needed to condition the air, oxygen, and/or hydrogen for input into the fuel cell, as well as complex (and heavy) heat exchangers and cooling systems needed to get rid of the excess waste heat being produced by the fuel cell. The storage of the critical fuel, hydrogen, poses even more problems, particularly from a weight and safety standpoint. Use of reformers to strip hydrogen from traditional hydrogen rich fuels like gasoline, methanol, diesel fuel, etc. are being explored for automotive use, but add even further weight and complexity for aviation use, particularly on smaller aircraft. In one instance a regenerative fuel cell system was incorporated into an unmanned aircraft as described in U.S. Pat. No. 5,810,284. However, regenerative fuel cells utilize a closed cycle and therefore require that sufficient fuel for the fuel cells be stored on board. To do so, tanks sized to contain enough fuel for the maximum duration of flight must be included even if a particular flight is to be of a shorter duration. As an empty tank represents over 90% of the fuel storage weight, this is a significant weight penalty. A similar penalty is paid for storing the fuel byproduct before it can be converted back to a usable form. Moreover, such a system requires the use of an electrolyzer to convert the water byproduct to a form suitable for reuse by the fuel cell. Such an electrolyzer also adds significant weight to the aircraft.

Therefore, there is still a need to provide methods and apparatus for light weight, high efficiency, reliable, and safe methods of powering aircraft, which also create little or no emissions, and are quieter and easier to service than conventional hydrocarbon fuel consuming engines, particularly internal combustion engines.

SUMMARY OF THE INVENTION

The present invention is directed to electrically powered aircraft having fuel cells as at least a partial source of electrical energy. In many instances the electrical energy powers an electric motor used to propel the aircraft. In some instances, the electric output from the fuel cell would be augmented by power from special high power "surge" batteries for critical takeoff and climbing, where the maximum electric power is required. In preferred embodiments, such fuel cell powered aircraft will supply oxygen to the fuel cell either from a container of oxygen carried on board the aircraft, or from a ram scoop which directs air through which the aircraft is moving to the fuel cell.

It is contemplated that fuel cell powered aircraft as described herein will be suitable for both manned and unmanned applications, will be simpler to build, repair and operate, will provide improved safety and reliability, will generate very little noise and virtually no pollutants, and ultimately will have lower total life cycle costs than existing aircraft.

It is also contemplated that fuel cell powered aircraft as described herein will be suitable for generally aviation as they will meet one or more of the following requirements: if the aircraft is a fixed wing aircraft, it will have a wingspan of less than 200 feet; the aircraft will be capable of climbing at a rate of at least 1000 feet per minute; the aircraft will be capable of achieving speeds of at least 100 miles per hour; and/or the aircraft will be able to carry at least 2 people, including the pilot.

It is further contemplated that the use of a hydrogen generator as a source of hydrogen for a fuel cell used in an aircraft will reduce or eliminate the need to hydrate the hydrogen in order to protect the fuel cell resulting in a corresponding weight reduction in the fuel cell systems by allowing removal of or reduction in size of hydration components.

It is further contemplated that the use of a ram input air duct or a container of pressurized air/oxygen will eliminate the need for a compressor to provide pressurized oxygen to the fuel cell with a corresponding weight reduction in the fuel cell systems resulting from not including any such compressor.

It is still further contemplated that fuel cell systems can be practically used on aircraft if such systems are weight optimized through the use of one or more of the following: graphite end plates, titanium tie bars, light weight heat exchangers, carbon composite tanks, and carbon fuel manifolds.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
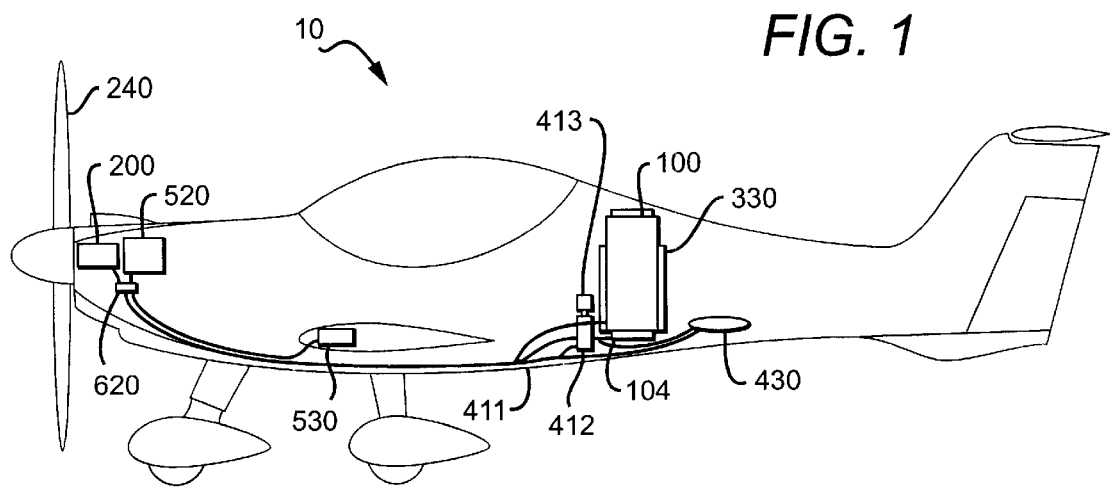
FIG. 1 is a partial schematic side view of an aircraft embodying the claimed invention.
Figure 2:
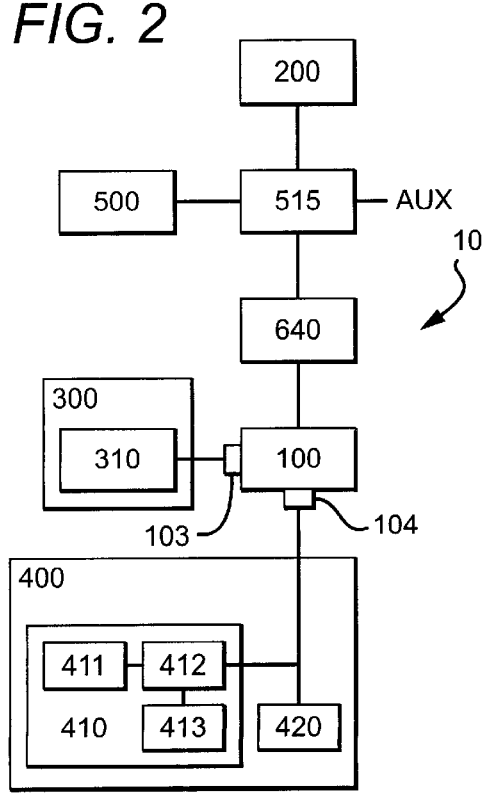
FIG. 2 is a first schematic view of many of the major components of a single engine aircraft embodying the claimed invention.
Figure 3:
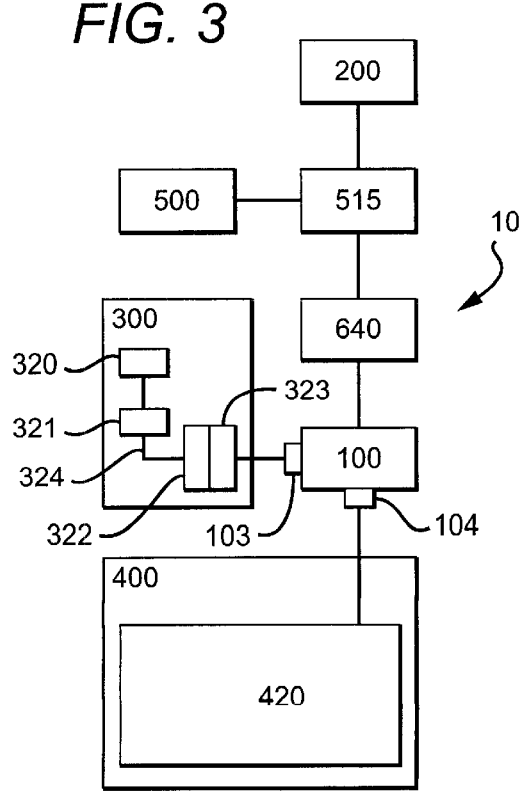
FIG. 3 is a second schematic view of many of the major components of a single engine aircraft embodying the claimed invention.

In FIGS. 1–3, an aircraft 10 comprises a fuel cell 100 adapted to provide electrical energy to at least one electrically powered device which, in the embodiment shown, is an electric motor 200 adapted to propel the aircraft 10. Aircraft 10 may be manned, remotely piloted, or capable of being both manned and remotely piloted. The term "manned" as used herein indicates that the aircraft carries at least one operator. Aircraft 10 may, among others, be an ultralight aircraft, a sport aviation aircraft, a military aircraft, a general aviation aircraft, a commercial passenger aircraft, a gyrocopter, or a helicopter.

Figure 5:
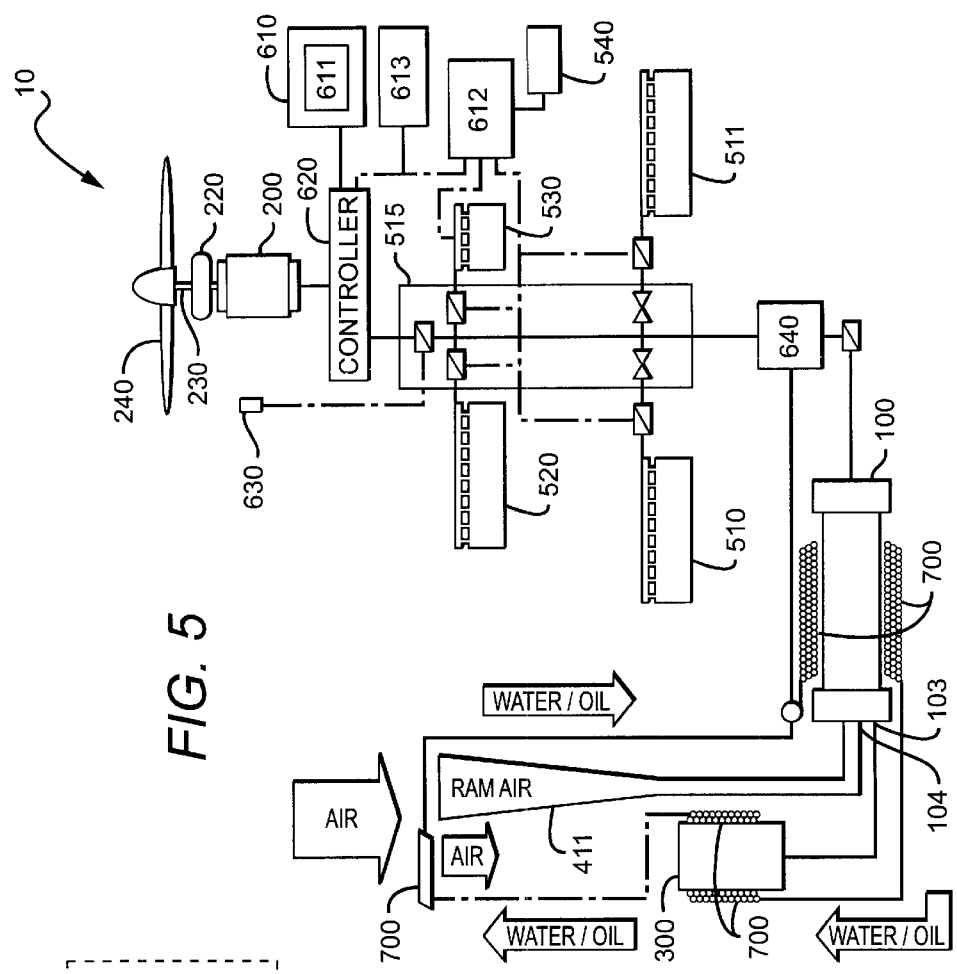
FIG. 5 is a fourth schematic view of many of the major components of a single engine aircraft embodying the claimed invention.

Motor 200 can be any electric motor of appropriate size and weight including, but not necessarily limited to, an electric motor such as a brush or brushless DC design or an AC induction design. It is preferred that motor 200 be a high efficiency electric motor used to rotate propeller 240. In most instances, aircraft 10 will also include a motor controller (such as controllers 620, 620A, and 620B in FIGS. 1, 5 and 6) which is a device which regulates the power provided to the motor so that the speed and power of the motor can be varied based upon flight requirements.

The term "fuel cell" as used herein refers to an electrochemical cell in which the energy of a reaction between a fuel, such as gaseous hydrogen, and an oxidant, such as gaseous oxygen, is converted directly and continuously into electrical energy. It should be noted that the term "fuel cell" as used herein does not include typical aviation fuselage/wing "fuel cells" which store gasoline or other hydrocarbon fuels.

It is also important to note that, although in many instances described elements of aircraft 10 may have alternative embodiments, such embodiments must be suitable for incorporation into the aircraft. As an example, although the use of fuel cells in automobiles is being studied, and regenerative fuel cells have been used in some specialty aircraft, such fuel cells are generally not suitable for use in general aviation aircraft, primarily because of the weight of various components of such systems. As will be discussed further on, many of the features of the various embodiments of aircraft 10 described herein reduce the weight of or eliminate the need for many of the components and thus make the use of a fuel cell in an aircraft feasible.

Fuel cell 100 may be one of many different types of fuel cells including, but not necessarily limited to, alkaline, phosphoric acid, molten carbonate, proton exchange membrane (PEM), polymer electrolyte membrane, direct methanol, direct ethanol, or solid oxide fuel cells. Hydrogen-oxygen fuel cells typically have only water as a waste product. Fuel cell 100 operates in a "load following" mode with hydrogen consumption being based upon the amount of electricity required by the load and motor controller. For more information on fuel cells, one may refer to "Fuel Cells—Green Power" by Sharon Thomas and Marcia Zalbowitz, herein incorporated by reference in its entirety.

In preferred embodiments, fuel cell 100 produces electrical energy from a reaction using hydrogen and oxygen. As such, aircraft 10 preferably comprises a hydrogen source 300 coupled to input 103 of fuel cell 100 and an oxygen source 400 coupled to input 104 of fuel cell 100 as best shown in FIGS. 2 and 3.

Hydrogen source 300 is adapted to provide hydrogen to the fuel cell. Any source of hydrogen suitable for use on an aircraft may be used, but it is contemplated that use of one or more of the following may be advantageous: a tank of pressurized hydrogen; a tank of liquid hydrogen; a container of metal hydride material; a container of carbon nanofibers; a hydrogen generator system; and a hydrocarbon fuel reformer. In cases where space and weight are limiting factors in airplanes, it may be desirable to limit the hydrogen storage capacity to only that which is required for the projected maximum flight duration (plus a 45 minute reserve), to allow for greater passenger load capacity.

It is preferred that hydrogen source 300 be a hydrogen generator 310 such as the Millennium Cell system as shown in FIG. 2. A "hydrogen generator", as the term is used herein, refers to any device which produces hydrogen on demand, typically from some chemical reaction such as one having water and borohydride as components. Such devices are available from companies such as Millennium Cell, Powerball, Via-tek, ElectroChem, and ATP. The Millennium Cell system pumps an aqueous solution of sodium borohydride from a tank through a special catalyst chamber which contains a noble metal like ruthenium, which reacts with the NaBH4 to produce pure hydrogen, which is cooled (in a heat exchanger) and fed to the fuel cell. An advantage of using this hydrogen source is that the hydrogen from hydrogen generator 310 is already hydrated, thus eliminating the need to include a hydrator or blower as part of hydrogen source 300 and potentially significantly reducing the weight of hydrogen source 300.

In an alternative embodiment shown in FIG. 3, the hydrogen source may be one or more nickel metal hydride tanks 320 containing gaseous hydrogen. In such a configuration the hydride tank 320 output would typically include a simple pressure regulator 321 between the fuel cell 100 and the hydride tank 320. The regulator 321 maintains a safe continuous supply of hydrogen for the fuel cell 100 (until the hydride tank 320 is depleted). In some cases, a hydrator 322 and blower 323 may also be included in the same hydrogen path 324 to assure that the hydrogen is moist enough to protect the membranes of fuel cell 100. It is preferred that any containers of hydrogen either be quickly refillable without having to remove them from aircraft 10, be quickly replaceable with a previously filled container.

In yet another alternative embodiment (shown in FIG. 1), hydrogen source 300 may comprise a container of metal hydride 330. Positioning such a container adjacent to and/or at least partially encasing fuel cell 100 will help reduce the path that hydrogen from the container must follow to reach fuel cell 100.

Oxygen source 400 is adapted to provide oxygen to the fuel cell. Any source of oxygen suitable for use on an aircraft may be used, but it is contemplated that use of a tank of pressurized oxygen and/or one or more ram air scoops is advantageous.

In a preferred embodiment, a ram air scoop system 410 is used to direct air through which the aircraft is passing into the fuel cell 100 as a pressurized source of oxygen. Ram air scoop system 410 preferably comprises an air input duct 411 that has an opening in the nose of the aircraft. Less preferred embodiments may use a duct 411 which is positioned along and conforms to the bottom of the aircraft and has an opening in the nose of the aircraft. As the use of such an air duct may be insufficient to supply oxygen to the fuel cell 100 when the aircraft is moving at relatively low speeds, aircraft 10 may also comprise an electric fan 412 and a fan power source 413. The fan power source 413 provides electrical power to the fan 412, which in turn forces air through a portion of the input ram air duct 411 and to the fuel cell 100. It is contemplated that the fan power source 413 be at least one of one of a fuel cell, a battery, a capacitor, and an electric generator.

It is contemplated that a tank of compressed oxygen (420 in FIG. 3, 430 in FIGS. 1 and 2) may be used in place of or in conjunction with ram air scoop system 410. If used in conjunction with ram air scoop system 410, tank 420 can provide bursts of oxygen to fuel cell 100 either when aircraft 10 is moving too slowly for ram air scoop 410 to provide sufficient oxygen to fuel cell 100, or when additional power output from fuel cell 100 is needed. Additional power from fuel cell 100 will typically be needed when the aircraft 10 is taking off or climbing, i.e. when motor 200 is temporarily operating at high power levels. It is preferred that any containers of oxygen be quickly replaceable with previously charged/filled containers of oxygen.

Figure 4:
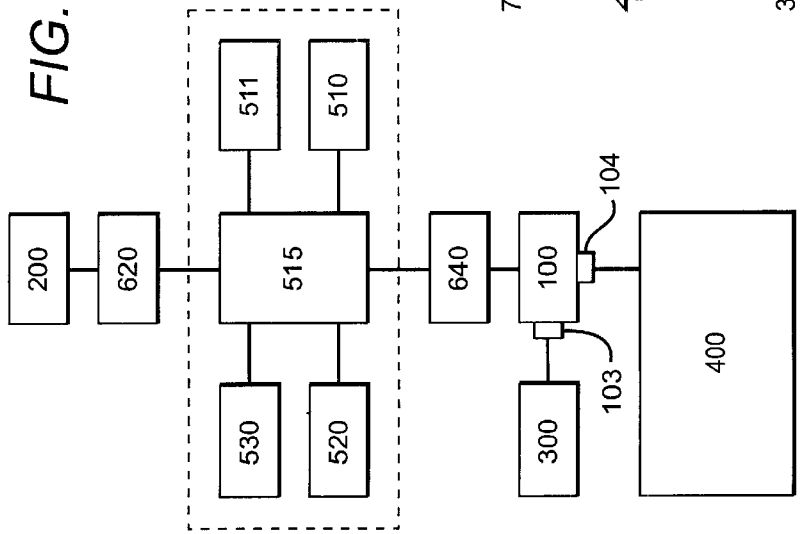
FIG. 4 is a third schematic view of many of the major components of a single engine aircraft embodying the claimed invention.

Aircraft 10 may also comprise one or more energy storage systems 500 as shown in FIG. 4. In some instances fuel cell 100 will power motor 200 via controllers 515 and 620, and energy storage systems 500 may act in a backup or boost capacity as shown in FIG. 1. In other instances fuel cell 100 will function to augment and/or recharge energy storage systems 500 as shown in FIG. 4. In still other instances, fuel cell 100 will function an independent auxiliary power generation device as depicted which allows an aircraft to operate heavy power devices such as electric air conditioners without ground power (or running the engine on conventional aircraft to create power from the engine alternators).

Almost any energy storage system may be used as a storage system 500 so long as the system is suitable for use in an aircraft. It is contemplated that suitable systems may comprise one or more energy storage devices including, but not necessarily limited to, a capacitor, a rechargeable battery, a lithium ion battery, a lithium polymer battery, a zinc air battery, an aluminum air battery, an alkaline battery or a combination flywheel and generator. Any charged energy storage system (i.e. any system containing energy) can be considered a power source. As used herein, the term "power source" refers to any device that provides electrical power. In some instances storage systems 500 may be charged by fuel cell 100, but may be charged solely or additionally from some other source, possibly one which is external to the aircraft 10. In yet other embodiments, individual storage systems may be charged differently from each other.

It is preferred that energy storage systems 500 have a specific energy higher than about 150 Wh/kg, can be recharged within about 90 minutes or less, and be able to provide peak currents of more than 100 amperes. Such energy storage systems might include batteries such as SAP lithium ion, Metallic Power's zinc air battery, aluminum air batteries, or even one-time thermal batteries, which might also be used in energy storage systems which are to provide emergency electrical power.

In embodiments in which fuel cell 100 is not to act as the primary power source form motor 200, it is preferred that storage systems 500 comprise a primary storage system 510, a boost or surge storage system 520, and an emergency backup storage system 530. Alternative embodiments may include more or few storage systems, and may use any storage systems for similar or differing purposes.

Primary storage system 510 is preferred to provide power to motor 200 and/or to some other electrical load 610 of aircraft 10 such as an air conditioning unit 611, or cockpit avionics 612. In configurations where fuel cell 100 is only an augmentive unit of lower power level, it is preferred that the peak power capacity of the main battery/primary storage system 510 be sufficient to allow the aircraft to operate solely with the main storage battery 510 output, and to take off and climb with additional energy from the surge storage system 520, without the assistance of the output of the fuel cell 100. Due to the limited capacity and fast charging characteristics of the energy storage systems 500, partial or complete recharging of the primary storage system 510 can be achieved from excess energy from the fuel cell in a period of less than 60 min, preferably less than 10 minutes, such as during descent, prior to landing. Use of additional storage systems 511 to supplement primary storage system 500 may advantageously extend the overall energy capacity when connected in parallel to the primary storage system 500, but may also be utilized to increase voltage where appropriate. Alternatively, additional storage systems 511 may be used to power devices less essential than motor 200 such as navigation and communication devices, stereos, air-conditioning, and so forth Boost or "surge" storage system 520 is preferred to provide supplemental power to the motor while the aircraft is taking off or climbing. With respect to the total energy capacity of the surge storage system 520, it is contemplated that various capacities may be required for different configurations, based upon the size aircraft 10, total load and the intended climb period. Surge storage systems 520 may comprise a bank or string of high power batteries that can deliver extremely large levels of current for short periods of time. Such batteries can be of various chemistries including lead acid batteries, especially thin metal film type like Johnson Inspira, NiCd batteries such as those used to start aircraft engines, Lithium Ion batteries, such as SAFT HP-12 batteries used in hybrid electric vehicles, or Nickel metal hydride batteries such as those used in electric vehicles. The total voltage of the series string of individual batteries would be designed to match the voltage level of the controller 620 and motor 200, and could typically be between 24 and 400 volts DC.

In preferred embodiments surge storage system 520 uses ultracapacitors instead of batteries. This provides the benefit of rapid recharge in flight, particularly during descent, so sufficient energy is available in the event of a missed approach and rapid climbout for reentry into the approach. Even with a completely discharged boost storage system 520, the primary storage system 510 will likely be able to deliver sufficient current to the motor 200 to effectively operate the motor for normal cruise flight, but may be unable to provide sufficient peak power for take off.

Emergency backup storage system 530 is preferred to supplement or replace primary storage system 510 in the event that any and all other power systems are unable to provide sufficient power to keep the aircraft in flight until a safe landing can be achieved. It is contemplated that one-time thermal batteries may prove to be advantageous for use in such a capacity. Such batteries are typically used in missiles, with rapid power generated instantly by intense chemical reaction. Although it would be prudent to have a special emergency backup storage system 530, in some cases a second "surge" storage system could be installed as an emergency power backup system 530 and function as both a surge power system 520 and backup power system 530.

It is preferred that storage systems 510, 520, and 530 be electrically isolated from electrical loads other than those required to control and propel the aircraft such as motor 200, master power controller 515, and basic controls and instruments. Other systems are preferably powered from an alternative power source 540 (which may be recharged from either the fuel cell 100 or via master power controller 515) to preserve the power of the primary, boost, and backup systems for more important needs. Master power controller 515 allows the various power sources to be properly interconnected, charged, and discharged, and allows the output of fuel cell 100 to be properly allocated. As an example, controller 515 may route power from fuel cell 100 to motor 200, or from fuel cell 100 to one of energy storage units 500, or between energy storage units 500. It is contemplated that controller 515 will route in a manner consistent with the characteristics of the various power sources.

A small independent 12–24V battery 540 may also be included for backup power to the radios and cockpit avionics and instruments to assure power if all other systems fail.

A range of various wiring and control configurations are also contemplated, including configurations with at least one manual or automatic switch, circuit breaker protection, onboard charge control devices, visual displays or other indicators for charge status, temperature, or other performance factors, etc. For example, in cases where ultracapacitors are used in place of batteries in the surge power system 520, a special rapid recharge system could be used to utilize excess power from the fuel cell system to recharge the capacitors so that they would be available despite prior use. Charge control systems may be installed on any batteries or battery banks with such charge control circuits being based on a microprocessor monitoring circuit, or a temperature gradient measured during charging, or on the measurement of the total charge current carried into the battery bank, or the voltage of the battery bank.

The use of fuel cell 100 will generally require the use of an electronic voltage converter 640 to match the voltage output of the fuel cell system 100 with the voltage level of the other power sources/storage devices 500 such as primary storage system 510 and surge storage system 520. The converter is preferred to operate as a "smart" DC to DC converter to continually match the fuel cell output voltage with the those of the power storage devices 500 inputs and/or outputs, all managed through master power controller 515.

Power to the motor 200 is controlled by electronic controllers, such as controller 620, which may be any of several devices. Appropriate power control means may include a multiphase controller and pulse width modulation, or a combination of a switch, contactor, IGBT, or a MOS-FET transistor. The operation of the controller 620 is via a normal throttle type lever 613 in the cockpit which rotates a potentiometer which varies the basic control voltage at the input of the controller 620. Various embodiments may utilize one or more inertial switches (630, 630A, and 630B) to provide means for cutting off power to any of the aircraft motors (200, 200A, and 200B) if the inertial switches are tripped in the event of a crash.

Figure 6:
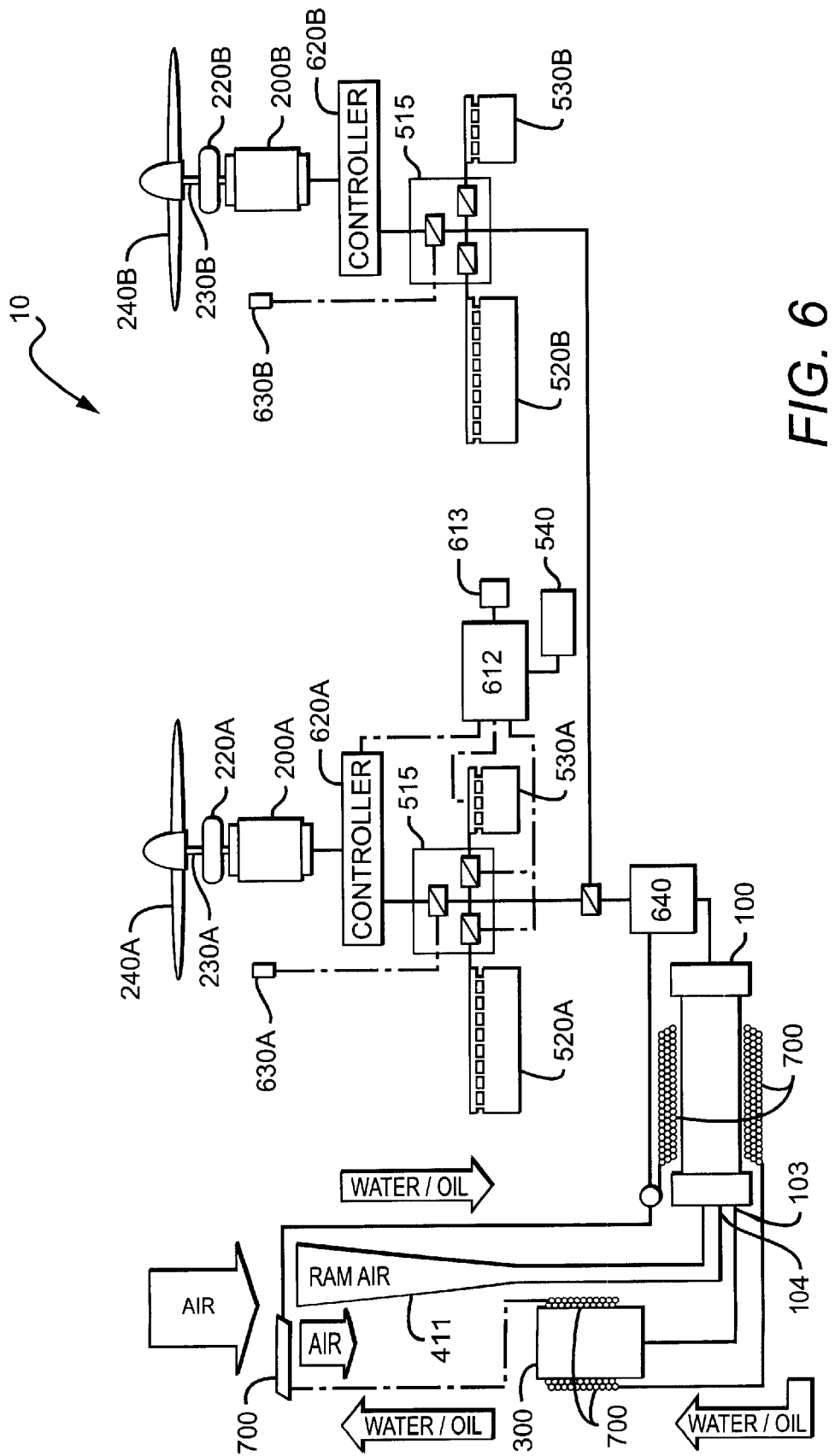
FIG. 6 is a schematic view of many of the major components of a multiengine/multi-motor aircraft embodying the claimed invention.

As shown in FIG. 6, an aircraft may employ two or more electric motors 200A and 200B for propulsion, and may employ multiple fuel cell systems for redundancy and safety. Each motor 200A and 200B would have its own controller (620A and 620B) for maximum flight control and overall redundancy, although the controllers 620A and 620B could all be housed in the same unit. It is still further contemplated that more than one surge power batteries (520A and 520B) may be employed in aircraft that use more than one motor (200A and 200B). All other components and operation are similar to the definitions above in FIG. 5.

Aircraft 10 may also include a heat exchange system 700 adapted to transfer excess heat from the aircraft components such as the electric motor, motor controller, fuel cell and hydrogen generator to air flowing past or into the aircraft. In preferred embodiments, a special input air duct will be used to provide airflow for cooling.

Thus, specific embodiments and features of a fuel cell powered electric airplane system have been disclosed. It should be apparent, however, to those skilled in the art that many more variations and modifications besides those already described are possible without departing from the inventive concepts herein. Such possibilities include but are not necessarily limited to aircraft having more, fewer, or differing combinations of fuel cells, motors, energy storage devices and/or other elements other than those described herein. Other possibilities include aircraft which utilize one or more fuel cells to power electrical devices other than electric motors used for propulsion. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An aircraft comprising an electric motor adapted to propel the aircraft;

a fuel cell adapted to provide electrical energy to the electric motor;

an input ram air duct adapted to provide pressurized air containing oxygen to the fuel cell; and an electric fan and a fan power source wherein the fan is adapted to force air through a portion of the input ram air duct, the fan power source provides electrical power to the fan, and the fan power source is at least one of one of a fuel-cell, a battery, a capacitor, and an electric generator.

2. The aircraft of claim 1 wherein the fuel cell is part of a non-regenerative system.

3. The aircraft of claim 1 wherein the motor is an AC motor.

4. The aircraft of claim 1 wherein the fuel cell is a phosphoric acid, alkaline, molten carbonate, proton exchange membrane (PEM), polymer electrolyte membrane, direct methanol, direct ethanol, or solidoxide fuel cell.

5. The aircraft of claim 1 wherein the aircraft is remotely piloted.

6. The aircraft of claim 1 wherein the aircraft is selected from the group consisting of an ultralight aircraft, a sport aviation aircraft, a military aircraft, a general aviation aircraft, a commercial passenger aircraft, a gyrocopter, and a helicopter.

7. The aircraft of claim 1 wherein the aircraft is capable of taking off and climbing and further comprises an energy storage device adapted to provide supplemental power to the motor while the aircraft is taking off or climbing.

8. The aircraft of claim 1 further comprising an energy storage device which is a capacitor, a rechargeable battery, a lithium ion battery, a lithium polymer battery, a nickel metal hydride battery, a zinc air battery, an aluminum air battery, an alkaline battery or a flywheel energy storage system.

9. The aircraft of claim 1 wherein the fuel cell provides electrical power to an electrical energy storage unit, and the electrical energy storage unit provides power to both the electric motor and to at least one other electrical load.

10. The aircraft of claim 1 further comprising a source of hydrogen adapted to provide hydrogen to the fuel cell wherein the source of hydrogen is one of a tank of pressurized hydrogen, a tank of liquid hydrogen, a container of metal hydride material, a container of carbon nanofibers, a hydrogen generator system, or a hydrocarbon fuel reformer.

11. The aircraft of claim 1 wherein the aircraft is capable of climbing at a rate of at least 1000 feet per minute while carrying at least two people, and the aircraft is a fixed wing aircraft having a wingspan of less than W feet where W is one of 200, 150, 100, and 50.

12. The aircraft of claim 1 wherein the fuel cell or one or more related components are weight optimized in that they comprise at least one of the following: graphite end plates, titanium tie bars, light weight heat exchangers, carbon composite tanks, and carbon fuel manifolds.

13. The aircraft of claim 1 further comprising a container of pressurized oxygen adapted to provide oxygen to the fuel cell and a container of pressurized hydrogen adapted to provide hydrogen to the fuel cell wherein the container of hydrogen and/or the container of oxygen can be refilled without being removed from the aircraft, and/or can be easily replaced with a pre-charged container.

14. The aircraft of claim 1 wherein the electric fan is a blower.

15. The aircraft of claim 1 further comprising a heat exchange system, a motor controller, and a hydrogen generator, and the heat exchange system is adapted to transfer excess heat from the electric motor, motor controller, fuel cell and hydrogen generator to air flowing through the ram air duct.

16. The aircraft of claim 15 further comprising a container of pressurized oxygen adapted to provide oxygen to the fuel cell at times when additional energy is required from the fuel cell.

* * * * *